US012674030B2

(12) United States Patent
Henning et al.

(10) Patent No.: US 12,674,030 B2
(45) Date of Patent: Jul. 7, 2026

(54) SILICONE (METH)ACRYLATES, PROCESS FOR THEIR PREPARATION AND THEIR USE IN CURABLE COMPOSITIONS

(71) Applicant: Evonik Operations GmbH, Essen (DE)

(72) Inventors: Frauke Henning, Essen (DE); Wilfried Knott, Essen (DE); Sadik Amajjahe, Duesseldorf (DE); Hardi Döhler, Essen (DE); Andrea Lohse, Bottrop (DE); Horst Dudzik, Essen (DE)

(73) Assignee: Evonik Operations GmbH, Essen (DE)

( * ) Notice: Subject to any disclaimer, the term of this patent is extended or adjusted under 35 U.S.C. 154(b) by 1086 days.

(21) Appl. No.: 17/762,840

(22) PCT Filed: Sep. 4, 2020

(86) PCT No.: PCT/EP2020/074752
§ 371 (c)(1),
(2) Date: Jul. 29, 2022

(87) PCT Pub. No.: WO2021/058263
PCT Pub. Date: Apr. 1, 2021

(65) Prior Publication Data

US 2022/0363838 A1 Nov. 17, 2022

(30) Foreign Application Priority Data

Sep. 27, 2019 (EP) .................................... 19200055

(51) Int. Cl.

| | |
|---|---|
| ***C08G 77/20*** | (2006.01) |
| ***B29C 64/314*** | (2017.01) |
| ***B33Y 40/10*** | (2020.01) |
| ***B33Y 70/00*** | (2020.01) |
| ***C08G 77/00*** | (2006.01) |
| ***C08G 77/08*** | (2006.01) |
| ***C08G 77/16*** | (2006.01) |
| ***C09D 183/06*** | (2006.01) |
| *B29K 83/00* | (2006.01) |

(52) U.S. Cl.
CPC ............ *C08G 77/20* (2013.01); *B29C 64/314* (2017.08); *B33Y 40/10* (2020.01); *B33Y 70/00* (2014.12); *C08G 77/08* (2013.01); *C08G 77/16* (2013.01); *C09D 183/06* (2013.01); *B29K 2083/00* (2013.01); *C08G 77/70* (2013.01)

(58) Field of Classification Search
CPC ...... C08G 77/20; C08G 77/70; B29C 64/314; C09D 183/06; C09D 183/04; B29K 2083/00
See application file for complete search history.

(56) References Cited

U.S. PATENT DOCUMENTS

| | | | |
|---|---|---|---|
| 3,595,885 | A | 7/1971 | Rossmy et al. |
| 4,177,201 | A | 12/1979 | De Montigny et al. |
| 4,380,451 | A | 4/1983 | Steinberger et al. |
| 4,824,922 | A | 4/1989 | Chapman |
| 4,978,726 | A | 12/1990 | Döhler et al. |
| 5,145,915 | A | 9/1992 | Weitemeyer et al. |
| 5,260,402 | A | 11/1993 | Weitemeyer et al. |
| 5,364,923 | A | 11/1994 | Mikami |
| 6,211,322 | B1 | 4/2001 | Döhler et al. |
| 6,268,404 | B1 | 7/2001 | Döhler et al. |
| 7,250,204 | B2 | 7/2007 | Brand et al. |
| 7,276,541 | B2 | 10/2007 | Döhler et al. |
| 7,598,334 | B2 | 10/2009 | Ferenz et al. |
| 7,645,848 | B2 | 1/2010 | Knott et al. |
| 7,754,778 | B2 | 7/2010 | Knott et al. |
| 7,825,205 | B2 | 11/2010 | Knott et al. |
| 7,825,206 | B2 | 11/2010 | Neumann et al. |
| 7,825,209 | B2 | 11/2010 | Knott et al. |
| 8,138,294 | B2 | 3/2012 | Henning et al. |
| 8,344,089 | B2 | 1/2013 | Frey et al. |
| 8,420,748 | B2 | 4/2013 | Henning et al. |
| 8,598,295 | B2 | 12/2013 | Henning et al. |
| 8,623,984 | B2 | 1/2014 | Henning et al. |
| 8,946,369 | B2 | 2/2015 | Henning et al. |
| 9,539,549 | B2 | 1/2017 | Haensel et al. |
| 10,399,998 | B2 | 9/2019 | Knott et al. |
| 10,407,592 | B2 | 9/2019 | Amajjahe et al. |
| 10,414,871 | B2 | 9/2019 | Knott et al. |
| 10,414,872 | B2 | 9/2019 | Knott et al. |
| 10,465,032 | B2 | 11/2019 | Doehler et al. |

(Continued)

FOREIGN PATENT DOCUMENTS

| | | |
|---|---|---|
| CA | 1125780 | 6/1982 |
| CN | 105061486 | 11/2015 |

(Continued)

OTHER PUBLICATIONS

Extended European Search Report dated Feb. 21, 2020 in European Patent Application No. 19200055.2, 6 pages.
U.S. Appl. No. 11/123,564, filed May 6, 2005, 2005/0209359, Brand et al.
U.S. Pat. No. 7,250,204, Jul. 31, 2007, 2004/0082681, Brand et al.
U.S. Appl. No. 11/013,639, filed Dec. 16, 2004, 2005/0136269, Doehler et al.
U.S. Appl. No. 11/780,799, filed Sep. 13, 2007, 2007/0299231, Doehler et al.
U.S. Pat. No. 7,276,541, Oct. 2, 2007, 2005/0054769, Döhler et al.
U.S. Appl. No. 11/851,521, filed Sep. 7, 2007, 2007/0295243, Dohler et al.

(Continued)

*Primary Examiner* — John M Cooney
*Assistant Examiner* — Adam J Berro
(74) *Attorney, Agent, or Firm* — Grüneberg Global IP, PLLC

(57) ABSTRACT

A process can be used for preparing silicone (meth)acrylates, according to which at least one acetoxysilicone is reacted with at least one hydroxyfunctional (meth)acrylic acid ester. The corresponding silicone (meth)acrylates are useful, and can be used in curable compositions.

11 Claims, No Drawings

(56) References Cited

U.S. PATENT DOCUMENTS

| | | | |
|---|---|---|---|
| 10,752,735 B2 | 8/2020 | Knott et al. | |
| 10,766,913 B2 | 9/2020 | Knott et al. | |
| 10,954,344 B2 | 3/2021 | Knott et al. | |
| 11,001,737 B2 | 5/2021 | Pomorin et al. | |
| 11,021,575 B2 | 6/2021 | Knott et al. | |
| 11,066,429 B2 | 7/2021 | Knott et al. | |
| 11,220,578 B2 | 1/2022 | Knott et al. | |
| 11,261,298 B2 | 3/2022 | Favresse et al. | |
| 11,279,804 B2 | 3/2022 | Knott et al. | |
| 11,286,351 B2 | 3/2022 | Knott et al. | |
| 11,286,366 B2 | 3/2022 | Knott et al. | |
| 2003/0168783 A1* | 9/2003 | Dams | C04B 41/009 427/340 |
| 2004/0082681 A1 | 4/2004 | Brand et al. | |
| 2005/0054769 A1 | 3/2005 | Doehler et al. | |
| 2005/0136269 A1 | 6/2005 | Doehler et al. | |
| 2005/0209359 A1 | 9/2005 | Brand et al. | |
| 2006/0155089 A1 | 7/2006 | Ferenz et al. | |
| 2007/0049717 A1 | 3/2007 | Knott et al. | |
| 2007/0197678 A1 | 8/2007 | Cavaleiro et al. | |
| 2007/0203307 A1 | 8/2007 | Cavaleiro et al. | |
| 2007/0295243 A1 | 12/2007 | Dohler et al. | |
| 2007/0299231 A1 | 12/2007 | Doehler et al. | |
| 2008/0153934 A1 | 6/2008 | Neumann et al. | |
| 2008/0153992 A1 | 6/2008 | Knott et al. | |
| 2008/0153995 A1 | 6/2008 | Knott et al. | |
| 2009/0030097 A1 | 1/2009 | Knott et al. | |
| 2010/0056649 A1 | 3/2010 | Henning et al. | |
| 2010/0249339 A1 | 9/2010 | Henning et al. | |
| 2010/0298455 A1 | 11/2010 | Henning et al. | |
| 2010/0298485 A1 | 11/2010 | Frey et al. | |
| 2012/0046486 A1 | 2/2012 | Henning et al. | |
| 2012/0279922 A1 | 11/2012 | Haensel et al. | |
| 2013/0217907 A1 | 8/2013 | Henning et al. | |
| 2013/0345318 A1 | 12/2013 | Schubert et al. | |
| 2017/0306062 A1* | 10/2017 | Ibe | C09D 151/08 |
| 2017/0369619 A1 | 12/2017 | Doehler et al. | |
| 2018/0044359 A1* | 2/2018 | Yamashita | C07F 7/1896 |
| 2018/0134850 A1 | 5/2018 | Knott et al. | |
| 2018/0258228 A1 | 9/2018 | Amajjahe et al. | |
| 2018/0319823 A1 | 11/2018 | Knott et al. | |
| 2019/0040205 A1 | 2/2019 | Knott et al. | |
| 2019/0048228 A1 | 2/2019 | Amajjahe et al. | |
| 2019/0100625 A1 | 4/2019 | Knott et al. | |
| 2019/0106441 A1 | 4/2019 | Knott et al. | |
| 2019/0112502 A1 | 4/2019 | Sloot et al. | |
| 2019/0161656 A1 | 5/2019 | Pomorin et al. | |
| 2020/0055991 A1 | 2/2020 | Knott et al. | |
| 2020/0055992 A1 | 2/2020 | Knott et al. | |
| 2020/0339612 A1 | 10/2020 | Knott et al. | |
| 2020/0377524 A1 | 12/2020 | Knott et al. | |
| 2020/0377525 A1 | 12/2020 | Knott et al. | |
| 2020/0377526 A1 | 12/2020 | Knott et al. | |
| 2020/0377640 A1 | 12/2020 | Knott et al. | |
| 2020/0377660 A1 | 12/2020 | Knott et al. | |
| 2020/0377663 A1 | 12/2020 | Favresse et al. | |
| 2020/0377665 A1 | 12/2020 | Knott et al. | |
| 2020/0377666 A1 | 12/2020 | Knott et al. | |
| 2020/0377669 A1 | 12/2020 | Knott et al. | |
| 2020/0377686 A1 | 12/2020 | Knott et al. | |
| 2021/0130551 A1 | 5/2021 | Knott et al. | |
| 2021/0163687 A1 | 6/2021 | Knott et al. | |
| 2021/0171719 A1 | 6/2021 | Knott et al. | |
| 2022/0033587 A1 | 2/2022 | Knott et al. | |
| 2022/0112398 A1 | 4/2022 | Döhler et al. | |

FOREIGN PATENT DOCUMENTS

| | | |
|---|---|---|
| EP | 0106047 | 4/1984 |
| EP | 940458 | 7/2004 |
| JP | 48-16991 B1 | 5/1973 |
| JP | 48-48000 A | 7/1973 |
| WO | 2019/105608 | 6/2019 |

OTHER PUBLICATIONS

U.S. Pat. No. 7,598,334, Oct. 6, 2009, 2006/0155089, Ferenz et al.
U.S. Pat. No. 7,645,848, Jan. 12, 2010, 2007/0049717, Knott et al.
U.S. Pat. No. 7,825,206, Nov. 2, 2010, 2008/0153934, Neumann et al.
U.S. Pat. No. 7,825,209, Nov. 2, 2010, 2008/0153995, Knott et al.
U.S. Pat. No. 7,825,205, Nov. 2, 2010, 2008/0153992, Knott et al.
U.S. Appl. No. 11/677,244, filed Feb. 21, 2007, 2007/0197678, Cavaleiro et al.
U.S. Appl. No. 11/677,821, filed Feb. 22, 2007, 2007/0203307, Cavaleiro et al.
U.S. Pat. No. 7,754,778, Jul. 13, 2010, 2009/0030097, Knott et al.
U.S. Pat. No. 8,598,295, Dec. 3, 2013, 2010/0249339, Henning et al.
U.S. Pat. No. 8,138,294, Mar. 20, 2012, 2010/0056649, Henning et al.
U.S. Pat. No. 8,420,748, Apr. 16, 2013, 2012/0046486, Henning et al.
U.S. Pat. No. 8,623,984, Jan. 7, 2014, 2010/0298455, Henning et al.
U.S. Pat. No. 8,344,089, Jan. 1, 2013, 2010/0298485, Frey et al.
U.S. Pat. No. 9,539,549, Jan. 10, 2017, 2012/0279922, Haensel et al.
U.S. Pat. No. 8,946,369, Feb. 3, 2015, 2013/0217907, Henning et al.
U.S. Appl. No. 13/923,896, filed Jun. 21, 2013, 2013/0345318, Schubert et al.
U.S. Pat. No. 10,465,032, Nov. 5, 2019, 2017/0369619, Doehler et al.
U.S. Pat. No. 10,407,592, Sep. 10, 2019, 2019/0048228, Amajjahe et al.
U.S. Appl. No. 15/760,855, filed Mar. 16, 2018, 2018/0258228, Amajjahe et al.
U.S. Pat. No. 11,001,737, May 11, 2021, 2019/0161656, Pomorin et al.
U.S. Pat. No. 10,414,871, Sep. 17, 2019, 2018/0134850, Knott et al.
U.S. Pat. No. 10,752,735, Aug. 25, 2020, 2019/0100625, Knott et al.
U.S. Pat. No. 10,399,998, Sep. 3, 2019, 2018/0319823, Knott et al.
U.S. Pat. No. 10,414,872, Sep. 17, 2019, 2019/0040205, Knott et al.
U.S. Pat. No. 10,766,913, Sep. 8, 2020, 2019/0106441, Knott et al.
U.S. Appl. No. 16/759,413, filed Apr. 27, 2020, 2020/0339612, Knott et al.
U.S. Appl. No. 16/142,408, filed Sep. 26, 2018, 2019/0112502, Sloot et al.
U.S. Pat. No. 10,954,344, Mar. 23, 2021, 2020/0055992, Knott et al.
U.S. Appl. No. 17/147,592, filed Jan. 13, 2021, 2021/0130551, Knott et al.
U.S. Appl. No. 15/929,836, filed May 26, 2020, 2020/0377640, Knott et al.
U.S. Appl. No. 17/048,709, filed Oct. 19, 2020, 2021/0171719, Knott et al.
U.S. Appl. No. 17/048,752, filed Oct. 19, 2020, 2021/0163687, Knott et al.
U.S. Appl. No. 16/850,198, filed Apr. 16, 2020, 2020/0377524, Knott et al.
U.S. Appl. No. 17/414,785, filed Jun. 16, 2021, 2022/0112398, Döhler et al.
U.S. Pat. No. 11,021,575, Jun. 1, 2021, 2020/0055991, Knott et al.
U.S. Appl. No. 17/297,372, filed May 26, 2021, 2022/0033587, Knott et al.
U.S. Pat. No. 11,286,366, Mar. 29, 2022, 2020/0377686, Knott et al.
U.S. Pat. No. 11,279,804, Mar. 22, 2022, 2020/0377669, Knott et al.
U.S. Appl. No. 16/849,106, filed Apr. 15, 2020, 2020/0377525, Knott et al.
U.S. Pat. No. 11,261,298, Mar. 1, 2022, 2020/0377663, Favresse et al.
U.S. Pat. No. 11,286,351, Mar. 29, 2022, 2020/0377665, Knott et al.
U.S. Pat. No. 11,066,429, Jul. 20, 2021, 2020/0377526, Knott et al.
U.S. Pat. No. 11,220,578, Jan. 11, 2022, 2020/0377660, Knott et al.
U.S. Appl. No. 16/851,385, filed Apr. 17, 2020, 2020/0377666, Knott et al.
International Search Report issued Oct. 6, 2020, in PCT/EP2020/074752, with English translation, 5 pages.

(56) References Cited

OTHER PUBLICATIONS

Written Opinion issued Oct. 6, 2020, in PCT/EP2020/074752, with English translation, 8 pages.

* cited by examiner

SILICONE (METH)ACRYLATES, PROCESS FOR THEIR PREPARATION AND THEIR USE IN CURABLE COMPOSITIONS

CROSS-REFERENCE TO RELATED APPLICATIONS

This application is the National Stage entry under § 371 of International Application No. PCT/EP2020/074752, filed on Sep. 4, 2020, and which claims the benefit of priority to European Application No. 19200055.2, filed on Sep. 27, 2019. The content of each of these applications is hereby incorporated by reference in its entirety.

BACKGROUND OF THE INVENTION

Field of the Invention

The invention relates to a method for preparing silicone (meth)acrylates in which at least one acetoxy silicone is reacted with at least one hydroxy-functional (meth)acrylic ester, to silicone (meth)acrylates prepared according to the method and use thereof in curable compositions.

In the context of this invention, silicone (meth)acrylates are understood to mean organosiloxanes bearing methacrylic ester groups and/or acrylic ester groups, also referred to below as (meth)acrylic ester groups. Organosiloxanes are also referred to hereinafter simply as siloxanes.

Description of Related Art

An organosiloxane is understood to mean a compound having organic radicals bonded to silicon atoms and also structural units of the formula ≡Si—O—Si≡, where "≡" represents the three remaining valencies of the silicon atom in question. The organosiloxanes are preferably compounds composed of units selected from the group consisting of M=[$R_3SiO_{1/2}$], D=[$R_2SiO_{2/2}$], T=[$RSiO_{3/2}$] and which optionally also have units of the formula Q=[$SiO_{4/2}$], where R is a monovalent organic radical. The radicals R may each be selected independently of one another here and are identical or different when compared in pairs. The radicals R can also be replaced in part by non-organic monovalent radicals such as hydroxyl groups or chlorine for example. Cited as a reference in relation to the M, D, T, Q nomenclature used in this document to describe the structural units of organosiloxanes is W. Noll, Chemie und Technologie der Silicone [Chemistry and Technology of the Silicones], Verlag Chemie GmbH, Weinheim (1960), page 2 ff.

Release coatings (often also referred to as abhesive coatings) are known from the prior art. They are used in many diverse ways for producing labels, adhesive tapes or hygiene articles. The release coating is characterized by low adhesion in contact with adhesives and consists of a radiation-cured silicone. For curing of functional silicones, typically two mechanisms are employed. In the case of cationic curing, an epoxy-functional organosiloxane is polymerized with the aid of a photoinitiator which releases an acid on irradiation. In the case of free-radical curing, a silicone (meth)acrylate is polymerized with the aid of a photoinitiator which forms radicals on irradiation.

The overwhelming majority of the silicone (meth)acrylates obtainable on the market is derived from the so-called SiC type, which is characterized in that the radicals bearing the (meth)acrylate group(s) are bonded via a silicon-carbon bond. To produce these silicone (meth)acrylates, one proceeds from hydrosiloxanes which are linked to hydroxy- or epoxy-functional olefins as reaction partners in a noble metal—usually platinum-catalyzed—hydrosilylation reaction to form a SIC bond. Subsequently, the hydroxy- or epoxy-functional silicones thus obtained are (meth)acrylated. This is described, for example, in WO 2017/080747 A1. Even if these methods reliably guarantee good product quality, they have severe cost disadvantages due to their multi-stage process, the use of high-priced hydrosiloxane and noble metal catalysts. To make matters worse, the complete removal of the catalyst content from the product matrices is not achieved in practice, so that by this route pure (noble) metal-free silicone (meth)acrylates cannot be obtained. Furthermore, for successful implementation of the reaction, the organic. i.e. Si-free, reactants must always be used in stoichiometric excess, which later necessitates their laborious distillative removal. Owing to the pronounced tendency of silicone (meth)acrylates to polymerization, such distillations on a production scale are demanding, tedious and costly in terms of process engineering.

In view of these difficulties in the production of silicone (meth)acrylates of the SIC type, efforts have already been made in the past, in the context of a more cost-effective alternative, to provide silicone (meth)acrylates, although as SiOC types, in which the (meth)acrylate group(s) or the organic radicals bearing the (meth)acrylate groups are bonded via a silicon-oxygen-carbon bond. In pursuit of this objective. DE 2948708 A1 and DE 3426087 A1 teaches the use of chlorosiloxanes, which are reacted with hydroxy-functional acrylate esters such as for example pentaerythritol triacrylate or hydroxypropyl acrylate, to give silicone acrylates of the SiOC type and these are then used in release coatings. The disadvantages of this method result from the use of chlorosiloxanes, the linkage of which with the hydroxy-functional (meth)acrylate esters unavoidably releases hydrochloric acid (HC). The target SiOC-linked silicone (meth)acrylate is however sensitive to hydrolysis such that large amounts of amine must be used to efficiently scavenge the hydrochloric acid released, which in turn results in high salt loads. In operational practice, a considerable filtration effort and accompanying product losses are expected.

A further disadvantage of the silicone (meth)acrylates of the SiOC type thus produced comes from their odour emissions, which is specifically unacceptable in use thereof for hygiene articles.

The more recent critical classification of cyclic siloxanes as SVHC substances (Substances of Very High Concern) still further reduces the attractiveness of these preparation routes since cyclic siloxanes cannot be distilled off from the chlorosiloxanes used without reequllibration occurring and even during storage of conversion products, catalyzed by acid and salt residues respectively, can regenerate.

To overcome these disadvantages. DE 10359764 A1 makes use of dehydrogenating coupling of hydrosiloxanes with hydroxy-functional (meth)acrylate esters. In this method, carried out in the presence of a catalyst, hydrogen gas is released which foams the reaction matrix as it leaves. Since (meth)acrylate groups have enhanced tendency to polymerize in the absence of oxygen, on the downside the presence of oxygen in a hydrogen-releasing process is always highly problematic to assess owing to considering explosion thresholds (oxyhydrogen gas formation), performance of this process is very demanding from a process engineering point of view. Complicating the situation for this reaction, relatively large amounts of an exotic organoboron catalyst are required which is toxic and costly and also cannot be removed from the product.

SUMMARY OF THE INVENTION

In view of these efforts affording to date only unsatisfactory results, the technical problem to be addressed consists of finding a simple, reliable and also cost-effective method for preparing silicone (meth)acrylates of the SiOC type which overcomes or does not have at all the disadvantages of the methods known to date. A particular requirement arises from the desire to dispense with the use of chlorine-substituted siloxanes. Beyond the focused production environment of direct synthesis operators (Miller-Rochow synthesis) arises the increasingly problematic handling of strongly caustic and highly corrosive chlorosilanes and/or chlorosiloxanes and which requires high investment with regard to logistics, handling, selection of material, apparatus technology, safety technology as well as disposal.

Surprisingly, it has now been found that without any of the previously mentioned difficulties silicone (meth)acrylates of the SiOC type are arrived at by reacting acetoxy silicones with hydroxy-functional (meth)acrylate esters. In the context of this invention, acetoxy silicone s are understood to mean organosloxanes bearing one or more acetoxy groups on one or more silicon atoms. The acetoxy silicones thus comprise at least one group of the formula ≡Si—OAc, where "OAc" is the acetoxy group and "≡" is the remaining three valencies of the silicon atom. In this case, one silicon atom can bear one or more acetoxy groups.

DETAILED DESCRIPTION OF THE INVENTION

As reactive starting materials for producing SiOC-based silicone derivatives, in particular SiOC-based polyether siloxanes, acetoxy silicones having linear or branched structure type are important compound classes.

Linking with the above embodiments, it is consequently preferable in the context of this invention also in the preparation of acetoxy silicones to dispense with highly caustic and highly corrosive chlorosilanes and/or chlorosiloxanes, which however were starting materials often used in the technical history of acetoxy silicones.

For instance, older routes for producing branched SiOC-bonded silicone polyethers for example also utilize, inter alia, the acid-catalysed reaction of chlorosilanes with acetic acid in the presence of siloxane cycles (U.S. Pat. No. 4,380,451). In addition to the fundamental disadvantages of chlorochemistry specified at the outset it is a feature of these processes that the replacement of silicon-bonded chlorine by acetoxy functions is incomplete as is apparent from the proposed (ibid., column 4, 1st line) siloxane intermediate formula. Similarly problematic is the teaching of EP 0003285 B1 which describes a process for producing linear and branched equilibrated organosiloxanes by reacting a chlorosilane or partial hydrolysates thereof with organosiloxanes and monobasic carboxylic acids in the presence of an acidic equilibration catalyst. With regard to the GC analysis (GC: of the α,ω-diacetoxypolydimethylsiloxanes disclosed therein it is stated (ibid., page 6, line 30) that the chlorosiloxanes present in small amounts were not taken into account in the evaluation of the GC measurement. On the other hand, the residual chlorine contents therein range between about 0.2% to 3.0%, as stated in the document (ibid.) on page 4, lines 44 to 46.

U.S. Pat. No. 3,595,885 describes a process for producing equilibrated acyloxy-functionalized siloxanes starting from equilibrated chlorosiloxanyl sulfates by reaction with carboxylic acids and/or carboxylic acid salts and/or carboxylic anhydrides. U.S. Pat. No. 3,595,885 teaches (column 5/lines 72-74) that products containing sulfuric acid groups must be expected ($—SO_4—$ and/or $—OSO_3H$ bonded to Si) when pure carboxylic acids and/or carboxylic anhydrides are employed. However, the examples supporting the remaining carboxylic acid salt route also do not demonstrate the freedom from sulfuric acid of the obtained acyloxysiloxanes, thus, however, rendering meaningless the stated objective of using the substances described therein as components in cold-curing silicone rubbers since these are reacted with hydroxy-functional silicones in the presence of a tin catalyst to hydrolyse the siloxanyl sulfate functions. This chlorine route characterized by questionable product quality is therefore not suitable for demanding applications (see in this regard also example IV, <0.5% chlorine content). In addition the reference to equilibrated acyloxy-functionalized siloxanes therein is not applicable. For example, if bridging sulfato groups incorporated in the silicone scaffolds were to be dissolved-out by the treatment with carboxylic acid salts, this will always afford shorter acyloxy-terminated cleavage products so that the resulting mixture is in no way a true equilibrate especially in comparison to the starting material.

The published publications WDO 2019/105808 A1 and EP 3492513 A1 and the as yet unpublished patent application PCT/EP2019/061655 are concerned with the production of SiOC-bonded polyether siloxanes, wherein trifluoromethanesulfonic acid-acidified, equilibrated acetoxysiloxanes having linear or branched structure type are used as reactive intermediates. Furthermore, the as yet unpublished European patent applications EP18210035.4 and EP19176876.1 are specifically directed at producing equilibrated acetoxysiloxanes.

For Instance, WO 2019/105608 and EP 3492513 A1 provides a process for producing trifluoromethanesulfonic acid-acidified, end-equilibrated, acetoxy group-bearing siloxanes which comprises reacting cyclic siloxanes, such as $D_4$ and/or $D_5$, and/or mixtures of cyclic branched siloxanes of the D/T type with acetic anhydride using trifluoromethanesulfonic acid as catalyst and with addition of acetic acid. The cyclic branched siloxanes of the D/T type used here are both described in detail in European patent application EP 3321304 A1 and in the as yet undisclosed patent application EP17169876.4.

European patent application EP 3321304 A1 discloses that one arrives at the mixtures of cyclic branched siloxanes of the D/T type, which consist exclusively of siloxanes comprising D and T units and whose $^{29}$Si-NMR spectroscopy-determinable cumulative proportion of D and T units comprising Si-alkoxy and/or SiOH groups present in the siloxane matrix is ≤2 mole percent, preferably less than 1 mole percent, and which advantageously further contain at least 5% by weight of siloxane cycles, such as preferably octamethylcyclotetrasiloxane ($D_4$), decamethylcyclopentasiloxane ($D_5$) and/or mixtures thereof, by reacting a trialkoxysilane in a solvent with siloxane cycles and/or α,ω-dihydroxypolydimethylsiloxane with addition of water and in the presence of at least one acidic catalyst.

In addition, EP17169876.4 states that one arrives at the mixtures of cyclic branched siloxanes exclusively comprising D and T units, whose $^{29}$Si-NMR spectroscopy-determinable cumulative proportions of D and T units comprising Si-alkoxy and/or SiOH groups present in the siloxane matrix are greater than 2 and less than 10 mole percent, by carrying out an acidic catalyzed equilibration of trialkoxysilanes with siloxane cycles and/or α,ω-dihydroxypolydimethyisiloxane in the presence of at least one acidic catalyst and subsequently a hydrolysis and condensation reaction induced by addition of water and addition of a silicon-containing solvent, followed by a distillative removal of the alcohol released, water present in the system and silicon-containing solvent and neutralization or removal of the acidic catalyst and optional removal, if possible, of salts formed. In this case, the silicon-containing solvent preferably comprises the isomeric siloxane cycles octamethylcyclotetrasiloxane ($D_4$), decamethylcyclopentasiloxane ($D_5$) and/or mixtures thereof, and mass ratios of silicon-containing solvent to the siloxane comprising D and T units of 1:1 to 5:1 are advantageously used.

The as yet unpublished patent application PCT/EP2019/061655 describes trifluoromethanesulfonic acid-acidified equilibrated α,ω-diacetoxypolydimethylsiloxanes, which are obtained by reacting cyclic siloxanes, especially $D_4$ and/or $D_5$, with acetic anhydride and preferably with addition of acetic acid, using trifluoromethanesulfonic acid as catalyst.

The as yet unpublished patent application EP18210035.4 describes a method for producing linear or branched siloxanes bearing acetoxy functions by reacting silanes and/or siloxanes bearing alkoxy groups, and/or silanes and/or siloxanes bearing acetoxy groups, and/or silanes and/or siloxanes bearing hydroxyl groups and also optionally simple siloxane cycles and/or DT cycles with acetic anhydride, perfluoroalkanesulfonic acid (especially trifluoromethanesulfonic acid) and also preferably acetic acid.

The as yet unpublished patent application EP19176876.1 discloses reaction systems for producing siloxanes bearing acetoxy functions having chain lengths greater than 3 silicon atoms, which comprise silanes and/or siloxanes bearing alkoxy groups and/or silanes and/or siloxanes bearing acetoxy groups, and/or silanes and/or siloxanes bearing hydroxyl groups and/or simple siloxane cycles and/or DT cycles, and also a reaction medium composed of acetic anhydride, Brønsted acid and acetic acid. In this case, Brønsted acids having a pKa≤−1.30, preferably having a pKa≤−2.90, particularly preferably having a pKa≤−4.90 are used, wherein the acetic acid in the reaction system is present in amounts from 0.4 to 15.0 percent by weight, preferably 0.5 to 10.0 percent by weight, preferably 0.8 to 6.5 percent by weight, particularly preferably in amounts from 1.0 to 6.0 percent by weight, based on the reaction system.

The as yet unpublished patent application EP19176876.1 also provides the molar ratio of Brønsted acid to acetic acid used, which in the case of Brønsted acids of category A) having a pKa≤−4.90 is in the range of ≥1/30 and ≤1/3 and in the case of Brønsted acids of category B) having a pKa of ≤−1.30 to ≥−4.80 is in the range of ≥1/10 and ≤1 and which in the case of mixtures of Brønsted acids of category A) and category B) is in the range of ≥1/30 and ≤1. Here, the sole use of trifluoromethanesulfonic acid and also of trifluoromethanesulfonic acid and acetic acid are excluded, and/or the Brønsted acid used at least in part has a pKa between −1.3 and >−13.5.

The as yet unpublished patent application EP19176874.6 describes the preparation of acetoxy-modified siloxanes by acid-catalyzed reaction, in a first step, of cyclic branched siloxanes of the D/T type with acetic anhydride optionally in a mixture with simple siloxane cycles and/or siloxanes bearing hydroxyl groups and/or silanes and/or siloxanes bearing acetoxy and/or alkoxy groups to give branched siloxanes bearing acetoxy groups and in a second step by carrying out equilibration of the acetoxy-modified siloxane with acids, preferably superacids, especially with addition of acetic acid, wherein the cyclic branched siloxanes of the D/T type are mixtures of cyclic branched siloxanes of the D/T type which, in addition to siloxanes having D and T units, optionally also comprise siloxanes having Q units, with the proviso that in these mixtures the proportion of Si atoms originating from Q units accounts for ≤10% by mass to ≥0% by mass, preferably ≤5% by mass to ≥0% by mass, based on the total of all Si atoms.

The as yet unpublished patent application EP19176871.2 discloses the preparation of acidic, preferably superacidic, especially trifluoromethanesulfonic acid-acidified end-equilibrated siloxanes bearing acetoxy groups by reacting cyclic siloxanes, especially comprising $D_4$ and/or $D_5$ and/or mixtures of cyclic branched siloxanes of the D/T type, optionally in mixtures with siloxanes bearing hydroxyl groups and/or silanes and/or siloxanes bearing acetoxy and/or alkoxy groups, using acids, preferably superacids, especially trifluoromethanesulfonic acid as catalyst, with acetic anhydride and with addition of acetic acid, wherein the cyclic branched siloxanes of the D/T type are mixtures of cyclic branched siloxanes of the D/T type which, in addition to siloxanes having D and T units, optionally also comprise siloxanes having Q units, with the proviso that in these mixtures the proportion of Si atoms originating from Q units accounts for ≤10% by mass to ≥0% by mass, preferably ≤5% by mass to ≥0% by mass, based on the total of all Si atoms.

Particularly preferred in accordance with the teachings of the documents stated here is the preparation and further processing of end-equilibrated Brønsted acid and especially preferably end-equilibrated trifluoromethanesulfonic acid-acidified siloxanes bearing acetoxy groups. This also applies to the present invention.

What is meant by the term "end-equilibrated" is that the equilibrium established at a temperature of 23° C. and a pressure of 1013.25 hPa has been attained. The indicator used for the attainment of the equilibrium may be the total cycles content determined by gas chromatography and defined as the sum total of the $D_4$, $D_5$ and $D_6$ contents, based on the siloxane matrix and ascertained after derivatization of the α,ω-diacetoxypolydimethylsiloxanes to give the corresponding α,ω-diisopropoxypolydimethylsiloxanes or after the derivatization of the branched acetoxysiloxanes to give the corresponding branched isopropoxysiloxanes. The inventive use of acetic acid makes it possible here without difficulty to undershoot otherwise customary equilibrium proportions of about 13 percent by weight of total cycles content for the linear α,ω-diacetoxypolydimethylsiloxanes and of about 8 percent by weight of total cycles content for the branched acetoxysiloxanes. Accordingly, it corresponds to an especially preferred embodiment when equilibrium proportions of the total cycles content of less than 13, preferably less than 12 percent by weight for the linear α,ω-diacetoxypolydimethylsiloxanes and equilibrium proportions of the total cycles content of less than 8, preferably less than 7 percent by weight for the branched acetoxysiloxanes are undershot. The derivatization to afford the α,ω-diisopropoxypolydimethylsiloxanes or to afford the branched isopropoxysiloxanes is intentionally chosen in order to prevent a thermally induced retrocleavage reaction of the α,ω-diacetoxypolydimethylsiloxanes or of the branched acetoxysiloxanes which may take place under the conditions or analysis by gas chromatography (regarding the retrocleavage reaction see inter alia J. Pola et al., Collect. Czech. Chem. Commun. 1974, 39(5), 1169-1176 and also W. Simmler, Houben-Weyl, Methods of Organic Chemistry, Vol. VI/2,4th Edition, O-Metal Derivates of Organic Hydroxy Compounds p. 162 ff.).

All technical teachings here omitting the use of chlorosilanes and/or chlorosiloxanes and/or chlorosiloxanyl sulfates for producing Brønsted acidic, preferably trifluoromethanesulfonic acidic acetoxy group-bearing siloxanes of linear or branched structural type are fully part of the disclosure content of the present invention.

As described in the introduction, the object of the present invention therefore consisted of overcoming at least one disadvantage of the methods used to date for producing silicone (meth)acrylates.

Surprisingly, it has now been found that a method for preparing silicone (meth)acrylates in which an acetoxy silicone is reacted with a hydroxy-functional (meth)acrylic ester achieves this object.

The object addressed by the present invention is therefore solved by the subject matter as described. Advantageous configurations of the invention are specified in the examples and the description.

The subject matter of the invention will be described by way of example below, without any intention that the invention be restricted to these illustrative embodiments. Where ranges, general formulae or classes of compounds are specified below, these are intended to encompass not only the corresponding ranges or groups of compounds which are explicitly mentioned but also all subranges and subgroups of compounds which can be obtained by removing individual values (ranges) or compounds. Where documents are cited within the context of the present description, the entire content thereof is intended to be part of the disclosure content of the present invention.

Where average values are reported hereinafter, these values are numerical averages unless stated otherwise. Where measurement values, parameters or material properties determined by measurement are reported hereinafter, these are, unless otherwise stated, measurement values, parameters or material properties which are measured at 25° C. and also preferably at a pressure of 101 325 Pa (standard pressure).

Where numerical ranges in the form “X to Y” are reported hereinafter, where X and Y represent the limits of the numerical range, this is synonymous with the statement “from at least X up to and including Y”, unless otherwise stated. Statements of ranges thus include the range limits X and Y, unless stated otherwise.

The expression “(meth)acrylic” stands for “methacrylic” and/or “acrylic”.

Wherever molecules/molecule fragments have one or more stereocentres or can be differentiated into isomers on account of symmetries or can be differentiated into isomers on account of other effects, for example restricted rotation, all possible isomers are included by the present invention.

The formulae (I) and (III) below describe compounds or radicals that are constructed from repeating units, for example repeating fragments, blocks or monomer units, and can have a molar mass distribution. The frequency of the repeating units is reported by indices. The indices used in the formulae should be regarded as statistical averages (numerical averages). The indices used and also the value ranges of the reported indices are thus understood to be averages of the possible statistical distribution of the structures that are actually present and/or mixtures thereof.

The various fragments or repeating units in the formulae (I) and (III) below may be distributed statistically. Statistical distributions are of blockwise construction with any desired number of blocks and with any desired sequence or are subject to a randomized distribution; they may also have an alternating construction or else form a gradient over the chain, where one is present; in particular they can also form all mixed forms in which groups with different distributions may optionally follow one another. In the context of the present invention, where compounds such as acetoxy silicones or silicone (meth)acrylaytes are described, which can have different units multiple times, then these can occur in these compounds in an unordered manner, for example statistically distributed, or in an ordered manner. The information on the number of units in such compounds is to be understood as an average (numerical average) averaged over all corresponding compounds. Specific embodiments may lead to restrictions of the statistical distributions as a result of the embodiment. For all regions unaffected by such restriction, the statistical distribution is unchanged.

A first subject matter of the Invention is a method for preparing silicone (meth)acrylates, characterized in that at least one acetoxy silicone is reacted with at least one hydroxy-functional (meth)acrylic ester.

It is preferable that the acetoxy silicone is a compound of the formula (I)

$$M_{m1}M^{AcO}_{m2}D_{d1}D^{AcO}_{d2}T_tQ_q \qquad \text{formula (I)},$$

where $M=[R_3SiO_{1/2}]$;

$M^{AcO}=[R_2(AcO)SiO_{1/2}]$;

$D=[R_2SO_{2/2}]$;

$D^{AcO}=[R(AcO)SiO_{2/2}]$;

$T=[RSiO_{3/2}]$;

$Q=[SiO_{4/2}]$;

m1=0 to 32, preferably 0 to 22, especially 0;

m2=0 to 32, preferably 1 to 10, especially 2;

d1=1 to 1000, preferably 5 to 500, especially 10 to 400;

d2=0 to 10, preferably 0 to 5, especialy 0;

t=0 to 10, preferably 0 to 5, especialy 1 to 5;

q=0 to 10, preferably 0 to 5, especially 1 to 5;

in which

R is in each case independently selected from the group consisting of monovalent organic radicals,
 is preferably in each case independently selected from the group consisting of monovalent hydrocarbon radicals having 1 to 30 carbon atoms,
 is particularly methyl;

AcO is an acetoxy group;

with the proviso that:

m1+m2=at least 2, preferably 2 to 20, especially 3 to 10;

m2+d2=at least 1, preferably 2 to 10, especially 2 to 6.

It is further preferred that the acetoxy silicone is not cyclic. It is therefore preferable that for the acetoxy silicone of the formula (I): m1+m2=2+t+2*q.

The monovalent organic radical R of the acetoxy silicone of the formula (I) is therefore different from AcO. It is further preferred that the monovalent organic radical R of the acetoxy silicone of the formula (I) is in each case independently selected from the group consisting of linear or branched, saturated or unsaturated, aromatic or aliphatic, substituted or unsubstituted hydrocarbon radicals. More preferably, the monovalent organic radical R of the acetoxy silicone of the formula (I) is in each case independently selected from saturated hydrocarbon radicals having 1 to 30 carbon atoms or aromatic hydrocarbon radicals having 6 to 30 carbon atoms, even more preferably from saturated hydrocarbon radicals having 1 to 14 carbon atoms or monocyclic aromatic hydrocarbon radicals. Even more preferably, the monovalent organic radical R of the acetoxy silicone of the formula (I) is in each case independently selected from the group consisting of methyl, ethyl, propyl and phenyl. In particular, R=methyl.

In this case, the acetoxy silicone can be prepared by various synthetic routes.

It is preferred that the acetoxy silicones are prepared by reacting a) silanes and/or siloxanes bearing alkoxy groups, and/or
b) silanes and/or siloxanes bearing acetoxy groups, and/or
c) silanes and/or siloxanes bearing hydroxyl groups, and/or
d) simple siloxane cycles and/or DT cycles, with acetic anyhdride, and also preferably acetic acid, and as catalyst at least one Brønsted acid having a pKa of ≤−1.3, preferably a superacid, more preferably perfluoroalkanesulfonic acid, particularly preferably trifluoromethanesulfonic acid.

The silanes used are preferably dialkoxydialkylsilanes and/or trialkoxyalkylsilanes, more preferably dialkoxydimethylsilanes and/or trialkoxymethylsilanes, especially diethoxydimethylsilane and/or triethoxymethylsilane.

The siloxanes used are preferably tetramethykdisiloxane, α,ω-dihydrogenpolydimethylsiloxanes, poly(methylhydrogen)siloxanes, α,ω-dialkoxypolydimethylsiloxanes and/or α,ω-divinylpolydimethylsiloxanes.

In the context of the invention, simple siloxane cycles are composed only of D units. Preferred simple siloxane cycles are octamethylcyclotetrasiloxane ($D_4$), decamethylcyclopentasiloxane ($D_5$), dodecamethylcyclohexasiloxane (De) and/or mixtures thereof.

DT cycles in the context of the invention are cyclic branched siloxanes of the D/T type which consist essentially, preferably exclusively, of D and T units and these units are obligatory. It is preferred that their cumulative proportion of D and T units present in the siloxane matrix and having Si-alkoxy and/or SiOH groups, determinable by $^{29}$Si-NMR spectroscopy, is ≤2 mole percent, preferably less than 1 mole percent, or else is greater than 2 and less than 10 mole percent.

The cyclic branched siloxanes of the D/T type can be mixtures of cyclic branched siloxanes of the D/T type which, in addition to siloxanes comprising D and T units, optionally also comprise siloxanes having Q units, with the proviso that in these mixtures the proportion of Si atoms originating from Q units accounts for ≤10% by mass to ≥0% by mass, preferably ≤5% by mass to ≥0% by mass, based on the total of all Si atoms.

Suitable acidic catalysts are the strong acids (equilibrating acids) known from the prior art for siloxanes, i.e. mineral acids, for example sulfuric acid, but also sulfonic acids, fluoroalkylsulfonic acids, for example trifluoromethanesulfonic acid, acidic aluminas or acidic ion exchange resins, for example the products known by the Amberlite®, Amberlyst® or Dowex® and Lewatit® brand names. Preference is given to superacids in this case. Superacids refer to acids which are stronger than concentrated (100 percent) sulfuric acid ($H_2SO_4$: pKa=−3.0). Preference is given to using perfluoroalkanesulfonic acids, particularly preferably trifluoromethanesulfonic acid.

Comprehensive compilations of the pKa values of Brønsted acids can be found in the literature and can be taken therefrom, for example CRC Handbook of Chemistry and Physics 99th edition, but also in electronic sources such as for example Evans pKa Table (evans.rc.fas.harvard.edu/pdf/evans_pKa_table.pdf) and "Das Periodensystem der Elemente online, pKs-Werte absteigend nach Wert sortiert" [The Periodic Table of the Elements online, sorted in descending order of pKa], 2010-2019, ©René Rausch. In addition, the methods known to those skilled in the art are available for determining the pKa. Apart from possibly anomalously referenced pKa values, potentiometric titration proves to be a particularly suitable method for the exact determination of pKa values for the purposes of the present invention. This method is long-established, cf. for example Benet L. Z., Goyan J. E.: Potentiometric determination of dissociation constants; J. Pharm. Sci. 56, 685-680 (1967).

It is also preferable to use those acetoxy silicones which are prepared by reacting cyclic siloxanes, especially comprising $D_4$ (octamethylcyclotetrasiloxane) and/or $D_5$ (decamethylcyclopentasiloxane), and/or cyclic branched siloxanes of the D/T type, preferably by reacting cyclic branched siloxanes of the D/T type (=DT cycles), particularly preferably by reacting a) mixtures of cyclic branched siloxanes of the D/T type which consist exclusively of siloxanes having D and T units and whose cumulative proportion of D and T units present in the siloxane matrix and having Si-alkoxy and/or SiOH groups, determinable by $^{29}$Si-NMR spectroscopy, is s 2 mole percent, preferably less than 1 mole percent, and which preferably contain at least 5 percent by weight of siloxane cycles, such as preferably octamethylcyclotetrasiloxane (04), decamethylcyclopentasiloxane ($D_5$) and/or mixtures thereof;

or b) mixtures of cyclic branched siloxanes having exclusively D and T units whose cumulative proportion of D and T units present in the siloxane matrix and having Si-alkoxy and/or SiOH groups, determinable by $^{29}$Si-NMR spectroscopy, is greater than 2 and less than 10 mole percent.

with acetic anhydride, preferably with addition of acetic acid, using trifluoromethanesulfonic acid as catalyst.

It is further preferable to use acetoxy silicones which have been prepared by reacting cyclic siloxanes, especially comprising $D_4$ and/or $D_5$, with acetic anhydride, preferably with addition of acetic acid, using trifluoromethanesulfonic acid as catalyst.

It is further preferable to use acetoxy silicones which have more than 3 silicon atoms and have been prepared by reacting a) silanes and/or siloxanes bearing alkoxy groups, and/or
b) silanes and/or siloxanes bearing acetoxy groups, and/or
c) silanes and/or siloxanes bearing hydroxyl groups, and/or
d) simple siloxane cycles, especially comprising $D_4$ and/or $D_5$ and/or DT cycles, with acetic anhydride, Brønsted acid and acetic acid, wherein Brønsted acids having a pKa≤−1.30, preferably having a pKa≤−2.90, particularly preferably having a pKa≤−4.90 are used and and wherein the acetic acid is present in amounts of 0.4 to 15.0 percent by weight, preferably 0.5 to 10.0 percent by weight, preferably 0.8 to 6.5 percent by weight, particularly preferably in amounts of 1.0 to 6.0 percent by weight, based on the reaction matrix, wherein the molar ratio of Brønsted acid used to acetic acid in the case of Brønsted acids of category A), which have a pKa≤−4.90, is in the range from ≥1/30 and ≤1/3 and in the case of Brønsted acids of category B), which have a pKa of ≤−1.30 to ≥−4.80, is in the range from ≥1/10 and ≤1 and in the case of mixtures of Brønsted acids of category A) and category B) Is in the range from ≥1/30 and ≤1, with the proviso that (i) either the sole use of trifluoromethanesulfonic acid and also of trifluoromethanesulfonic acid and acetic acid is excluded, and/or that (ii)

the Brønsted acid used at least in part has a pKa between ≤−1.3 and ≥−13.5, wherein the Brønsted acid is optionally at least partly provided in situ, preferably by use of a Brønsted acid salt-Brønsted acid combination, such as preferably aluminium triflate/methanesulfonic acid, bismuth triflate/methanesulfonic acid and/or sodium triflate/methanesulfonic acid and/or sodium triflate/sulfuric acid.

It is further preferable to use those acetoxy silicones which have been prepared by acid-catalyzed reaction, in a first step, of cyclic branched siloxanes of the D/T type with acetic anhydride optionally in a mixture with simple siloxane cycles and/or siloxanes bearing hydroxyl groups and/or silanes and/or siloxanes bearing acetoxy and/or alkoxy groups, to give branched siloxanes bearing acetoxy groups and in a second step by carrying out equilibration of the branched siloxanes bearing acetoxy groups with acids, preferably superacids, especially with addition or acetic acid, wherein the cyclic branched siloxanes of the D/T type are mixtures of cyclic branched siloxanes of the D/T type which, in addition to siloxanes having D and T units, optionally also comprise siloxanes having Q units, with the proviso that in these mixtures the proportion of Si atoms originating from Q units accounts for ≤10% by mass to ≥0% by mass, preferably ≤5% by mass to a 0% by mass, based on the total of all Si atoms.

It is also preferable to use as acetoxy silicones acidic, preferably superacidic, especially trifluoromethanesulfonic acid-acidified end-equilibrated siloxanes bearing acetoxy groups which have been prepared by reacting cyclic siloxanes, especially comprising $D_4$ and/or $D_5$ and/or mixtures of cyclic branched siloxanes of the D/T type, optionally in mixtures with siloxanes bearing hydroxyl groups and/or silanes and/or siloxanes bearing acetoxy groups and/or alkoxy groups, using acids, preferably superacids, especially trifluoromethanesulfonic acid as catalyst, with acetic anhydride and with addition of acetic acid, wherein the cyclic branched siloxanes of the D/T type are mixtures of cyclic branched siloxanes of the D/T type which, in addition to siloxanes having D and T units, optionally also comprise siloxanes having Q units, with the proviso that in these mixtures the proportion of Si atoms originating from 0 units accounts for ≤10% by mass to ≥0% by mass, preferably ≤5% by mass to ≥0% by mass, based on the total of all Si atoms.

It is further preferable in the method according to the invention for preparing silicone (meth)acrylates to use as acetoxy silicones Brønsted-acidic, equilibrated linear α,ω-acetoxy silicones having more than 3 silicon atoms, having total cycles contents, defined as the sum total of the content fractions of the cyclic siloxanes comprising $D_4$, $D_5$ and $D_6$, based on the siloxane matrix and determined by gas chromatography after their derivatization to give the corresponding linear α,ω-isopropoxysiloxanes, of less than 20, preferably less than 13, particularly preferably less than 12 percent by weight.

It is further preferable in the method according to the invention for preparing silicone (meth)acrylates to use as acetoxy silicones Brønsted-acidic, equilibrated branched siloxanes bearing acetoxy groups, having total cycles contents, defined as the sum total of the content fractions of the cyclic siloxanes comprising $D_4$, $D_5$ and $D_6$, based on the siloxane matrix and determined by gas chromatography after their derivatization to give the corresponding branched isopropoxysiloxanes, of less than 20, preferably less than 8, particularly preferably less than 7 percent by weight.

As already described above, the acetoxy silicones prepared by the preferred methods usually comprise the Brønsted acid or superacid or perfluoroalkanesulfonic acid or trifluoromethanesulfonic acid used as catalyst. Therefore, the acetoxy silicones are preferably Brønsted acid, preferably superacid, more preferably perfluoroalkanesulfonic acid, particularly preferably trifluoromethanesulfonic acid-acidified acetoxy silicones.

These Brønsted acid, preferably superacid, more preferably perfluoroalkanesulfonic acid, particularly preferably trifluoromethanesulfonic acid-acidified acetoxy silicones can be preferably reacted directly with hydroxy-functional (meth)acrylic acids to give silicone (meth)acrylates.

An alternative, likewise preferred embodiment of the method according to the invention is characterized in that these Brønsted acid, preferably superacid, more preferably perfluoroalkanesulfonic acid, particularly preferably trifluoromethanesulfonic acid-acidified acetoxy silicones are neutralized with a base before they are further reacted with hydroxy-functional (meth)acrylic acids to give silicone (meth)acrylates.

The acetoxy silicone can in this case be neutralized by a solid, liquid or gaseous base, wherein preference is given to the use of a solid base, particularly in the form of carbonates and/or hydrogencarbonates of alkali metal and/or alkaline earth metal elements and/or of ammonium or the use of liquid bases, in this case preferably aliphatic and/or aromatic and/or alkylaromatic amines, or the use of ammonia as gaseous base. Particular preference is given to using in particular sodium hydrogencarbonate and sodium carbonate. Preferably, the amount of solid, liquid or gaseous base added to the amount of acid(s) present in the reaction mixture is measured. Preferably, the proportion by mass of base is from 0.5% to 5%, especially from 0.8% to 2%, based on the mass of the reaction mixture without base. Preference is given to using the base in stoichiometric amounts. Relatively large excesses of base are particularly disadvantageous for the method according to the invention carried out on an industrial scale since, for example, the accompanying salt precipitation directly causes the filtration burden to be driven. Likewise disruptive, large amounts of liquid organic bases (amines) has an impact since these remain in the product.

It Is also preferred that the acetoxy silicone does not comprise any chlorine. Such acetoxy silicones can be obtained by the aforementioned preferred methods for preparing the acetoxy silicone.

End-equilibrated acetoxy silicones are preferably used as acetoxy silicones. These can also be obtained by the aforementioned preferred methods for preparing the acetoxy silicone.

Linear or branched acetoxy silicones are particularly suitable for the further preparation of silicone (meth)acrylates. Suitable linear acetoxy silicones are preferably α,ω-acetoxy silicones, i.e. organosiloxanes bearing terminal acetoxy groups. The linear acetoxy silicones are preferably composed of simple siloxane cycles which are exclusively based on D units. The branched acetoxy silicones are preferably prepared from cyclic branched siloxanes of the D/T type which consist of both D units and T units. The simple siloxane cycles or cyclic branched siloxanes of the D/T type can be reacted as described above with acetic anhydride and preferably additionally with acetic acid in the presence of an acid catalyzing the reaction to give acetoxy silicones.

The acetoxy silicone prepared according to the invention is then reacted with at least one hydroxy-functional (meth) acrylic ester to give a silicone (meth)acrylate.

It is preferable that the hydroxy-functional (meth)acrylic ester is a compound of the formula (II)

formula (II)

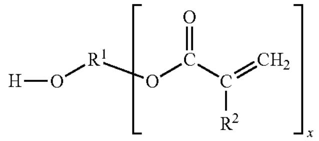

, where x=at least 1, preferably 1 to 3, especially 1;

in which $R^1$ is in each case independently selected from the group consisting of (x+1)-valent organic radicals,
  is preferably in each case independently selected from the group consisting of hydrocarbon radicals having 1 to 40 carbon atoms, which may be interrupted by oxygen and/or nitrogen atoms and/or NH groups,
  is especially in each case independently selected from the group consisting of divalent alkylene and polyoxyalkylene radicals, $R^2$ is in each case independently a hydrogen radical or a methyl radical.

The hydroxy-functional (meth)acrylate esters may bear, for example, primary and/or secondary and/or tertiary OH groups. They can also be used in the form of regioisomeric mixtures. $R^1$ may be linear or branched, saturated or unsaturated, aromatic or aliphatic, substituted or unsubstituted. Preferably, $R^1$ is selected from the group consisting of divalent radicals (x=1), more preferably an alkylene group or a polyoxyalkylene group. $R^1$ is particularly preferably an ethylene group ($—CH_2—CH_2—$) or a propylene group ($—CH(CH_3)CH_2—$/$—CH_2CH(CH_3)—$). Furthermore. $R^2$ is particularly preferably a hydrogen radical, i.e. Particular preference is thus given to using acrylate esters.

Suitable (meth)acrylate esters may be selected, for example, from the group consisting of 2-hydroxyethyl acrylate, 2-hydroxy-1-propyl acrylate (1,2-propanediol 1-acrylate), 1-hydroxy-2-propyl acrylate (1,2-propanediol 2-acrylate), 1-hydroxy-3-propyl acrylate (1,3-propanediol 1-acrylate), pentaerythritol triacrylate, 2-hydroxyethyl methacrylate, 2-hydroxy-1-propyl methacrylate (1,2-propanediol 1-methacrylate), 1-hydroxy-2-propyl methacrylate (1,2-propanediol 2-methacrylate), 1-hydroxy-3-propyl methacrylate (1,3-propanediol 1-methacrylate) and pentaerythritol trimethacrylate.

In accordance with the invention, the hydroxy-functional (meth)acrylate is preferably used in at least a stoichiometric amount based on the acetoxy groups bonded to the acetoxy silicone, more preferably in amounts from 1.03 to 1.15, especially in amounts from 1.05 to 1.10, based on the acetoxy silicone. It is therefore preferred that the molar ratio of the hydroxyl groups of the at least one hydroxy-functional (meth)acrylic ester to the acetoxy groups of the at least one acetoxy silicone is at least 1.00, preferably 1.03 to 1.15, especially 1.05 to 1.10.

In accordance with the invention, the reaction of the acetoxy silicone with the hydroxy-functional (meth)acrylate ester is preferably carried out in a solvent, more preferably in an aprotic solvent, even more preferably in ethers, ketones, aromatic hydrocarbons and/or mixtures thereof, still more preferably in toluene, xylene, tetrahydrofuran, diethyl ether, acetone, methyl isobutyl ketone and/or mixtures thereof. However, the reaction of the acetoxy silicone with the hydroxy-functional (meth)acrylate ester is particularly preferably carried out without solvent.

In accordance with the invention, the reaction can preferably be carried out by adding a solid, liquid or gaseous base. However, the reaction is particularly preferably carried out without the use of a base.

The reaction of the acetoxy silicone with the hydroxy-functional (meth)acrylate ester is preferably carried out using a catalyst. The catalysts used for the condensation reaction are preferably acids.

It is preferred in this case that the at least one acetoxy silicone is reacted with the at least one hydroxy-functional (meth)acrylic ester in the presence of a catalyst selected from the group consisting of a) Brønsted acids having a pKa of <−3, preferably sulfonic acids or halocarboxylic acids, particularly selected from the group consisting of trifluoromethanesulfonic acid, methanesulfonic acid, para-toluenesulfonic acid and trifluoroacetic acid;

and/or b) Lewis acids;

and/or c) metal catalyst, preferably selected from the group consisting of alkyl titanates (titanium alkoxides), metal carboxylates and metal acetylacetonate complexes, particularly selected from the group consisting of titanium tetrabutoxide, zinc acetylacetonate and zinc carboxylate.

To avoid an undesired polymerization of the (meth) acrylate groups during and after the reaction of the reaction mixture comprising the hydroxy-functional (meth)acrylate esters, the acetoxy silicone and preferably the acid catalyzing the condensation, a radical scavenger/inhibitor is added to the reaction mixture preferably before or during the reaction. Suitable radical scavengers/inhibitors are sufficiently known to those skilled in the art. Suitable radical scavengers/inhibitors are, for example, hydroxy-functional aromatic hydrocarbons, quinones, heterocyclic compounds having nitrogen and/or sulfur groups, and sterically hindered amines. The radical scavenger/inhibitor is preferably selected from the group consisting of methylhydroquinone, para-methoxyphenol and phenothiazine. Particular preference is given to using methylhydroquinone. It is further preferred that the proportion by mass of radical scavengers/inhibitors is from 0.05% to 1.0%, preferably from 0.1% to 0.5%, especially from 0.2% to 0.4%, based on the mass of the reaction mixture.

It is preferred in accordance with the invention that the reaction of the at least one acetoxy silicone with the at least one hydroxy-functional (meth)acrylic ester is carried out at a temperature of 40° C. to 150° C., particularly preferably 70° C. to 120° C., over a period of one to 8 hours, preferably over a period of 3 to 8 hours. The reaction is preferably carried out at pressures of 1 mbar to 1013 mbar.

The reaction product obtained may comprise volatile reaction products and/or by-products. It is advantageous to substantially remove these. It is therefore preferred to free the reaction product of volatile constituents, for example volatile reaction products and/or by-products, for 1 to 8 hours, preferably 1 to 4 hours, at a temperature of 80° C. to 140° C., preferably 100° C. to 130° C., under application of a vacuum of less than 200 mbar, preferably less than 20 mbar, especially of less than 4 mbar. The terminology "reaction product free of volatile constituents" Is understood to mean here to reduce the proportion of volatile constituents in the reaction product.

After freeing of volatile constituents, the reaction product can possibly contain acid. It is therefore preferred that acids possibly present in the reaction product are neutralized at a temperature of 20° C. to 110° C., preferably 40° C. to 80° C., by adding a solid, liquid or gaseous base, wherein preference is given to the use of a solid base, particularly in the form of carbonates and/or hydrogencarbonates of alkali metal and/or alkaline earth metal elements and/or of ammonium or the use of liquid bases. In this case preferably aliphatic and/or aromatic and/or alkylaromatic amines, or the use of ammonia as gaseous base. Particular preference is given to using in particular sodium hydrogencarbonate and sodium carbonate. Preferably, the amount of solid, liquid or gaseous base added to the amount of acid(s) present in the reaction mixture is measured.

Preferably, the proportion by mass of base is from 0.5% to 5%, especially from 0.8% to 2%, based on the mass of the reaction mixture without base. Preference is given to using the base in stoichiometric amounts. Relatively large excesses of base are particularly disadvantageous for the method according to the invention carried out on an industrial scale since, for example, the accompanying salt precipitation directly causes the filtration burden to be driven. Likewise disruptive, large amounts of liquid organic bases (amines) has an impact since these remain in the product. In order to purify the reaction product, filtration can optionally be carried out. Filter aids used in this case can be, for example, cellulose, silica gel, kieselgur or perlite. The proportion of undesirable substances or impurities in the reaction product can also be reduced by means of activated carbon and/or bleaching earths such as Tonsil®.

The invention therefore also further relates to a product (also referred to as a method product or reaction product) that is preparable by the method according to the invention.

The invention relates further still to a silicone (meth) acrylate that is preparable by the method according to the Invention.

The product according to the invention comprises or consists (essentially) of at least one silicone (meth)acrylate according to the invention.

These products or silicone (meth)acrylates obtained by the method according to the invention are characterized in particular in that they are free or substantially free of heavy metals (for example in the form of heavy metal ions or heavy metal compounds), boron (for example in the form or boron compounds) and/or chlorine (for example in the form of chlorides or chlorine compounds). The proportion by mass of heavy metals, boron and/or chlorine, based on the mass of the method product or of the at least one silicone (meth) acrylate, is preferably ≤0.5%, especially ≤0.01%. Heavy metals are preferably understood to mean those metals whose density under standard conditions is greater than 5.0 $g/cm^3$.

It is further preferred that the content of cyclic siloxanes in the silicone (meth)acrylates obtained by the method according to the invention is low. It is therefore preferred that the total cycles content in the method product determined by gas chromatography, defined as the sum total of the proportions by mass of $D_4$, $D_5$ and $D_6$, based on the mass of the method product or silicone (meth)acrylate, is ≤0.1%, especially ≤0.05%.

The silicone (meth)acrylates according to the Invention are preferably compounds of the formula (III), $$M_{m1}M^{Acr}_{m2}D_{d1}D^{Acr}_{d2}T_tQ_q \quad \text{formula (III),}$$

where $M=[R_3SiO_{1/2}]$;

$M^{Acr}=[RR^{Acr}SiO_{1/2}]$;

$D=[R_2SiO_{2/2}]$;

$D^{Acr}=[RR^{Acr}SiO_{2/2}]$;

$T=[RSiO_{3/2}]$;

$Q=[SiO_{4/2}]$;

m1=0 to 32, preferably 0 to 22, especially 0;

m2=0 to 32, preferably 1 to 10, especially 2;

d1=1 to 1000, preferably 5 to 500, especially 10 to 400;

d2=0 to 10, preferably 0 to 5, especially 0;

t=0 to 10, preferably 0 to 5, especially 1 to 5;

q=0 to 10, preferably 0 to 5, especially 1 to 5;

with the proviso that:

m1+m2=at least 2, preferably 2 to 20, especially 3 to 10;

m2+d2=at least 1, preferably 2 to 10, especially 2 to 6;

in which

R is in each case independently selected from the group consisting of monovalent organic radicals,
  is preferably in each case independently selected from the group consisting of monovalent hydrocarbon radicals having 1 to 30 carbon atoms,
  is particularly methyl;

$R^{Acr}$ is in each case independently selected from monovalent radicals of the formula (IV).

formula (IV)

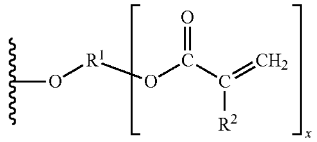

, where x=at least 1, preferably 1 to 3, especially 1;

in which $R^1$ is in each case independently selected from the group consisting of (x+1)-valent organic radicals,
  is preferably in each case independently selected from the group consisting of hydrocarbon radicals having 1 to 40 carbon atoms, which may be interrupted by oxygen and/or nitrogen atoms and/or NH groups,
  is especially in each case independently selected from the group consisting of divalent alkylene and polyoxyalkylene radicals;

$R^2$ is in each case independently a hydrogen radical or a methyl radical.

It is therefore preferred that the method product comprises or consists (essentially) of at least one silicone (meth) acrylate of the formula (III).

It Is further preferred that the method product or silicone (meth)acrylate is not cyclic. It is therefore preferable that for the silicone (meth)acrylate of the formula (III): m1+m2=2+t+2*q.

The monovalent organic radical R of the silicone (meth) acrylate of the formula (III) is different in this case from $R^{Acr}$. It is further preferred that the monovalent organic radical R of the silicone (meth)acrylate of the formula (III) is in each case independently selected from the group consisting of linear or branched, saturated or unsaturated, aromatic or aliphatic, substituted or unsubstituted hydrocarbon radicals. More preferably, the monovalent organic radical R of the silicone (meth)acrylate of the formula (III) is in each case independently selected from saturated hydrocarbon radicals having 1 to 30 carbon atoms or aromatic hydrocarbon radicals having 6 to 30 carbon atoms, even more preferably from saturated hydrocarbon radicals having 1 to 14 carbon atoms or monocyclic aromatic hydrocarbon radicals. Even more preferably, the monovalent organic radical R of the silicone (meth)acrylate of the formula (III)

is in each case independently selected from the group consisting of methyl, ethyl, propyl and phenyl. In particular, R=methyl.

The radicals $R^{Acr}$ are derived from hydroxy-functional (meth)acrylate esters bearing primary and/or secondary and/or tertiary OH groups. The radicals $R^{Acr}$ can thus be derived, for example, from regioisomeric mixtures. $R^1$ may be linear or branched, saturated or unsaturated, aromatic or aliphatic, substituted or unsubstituted. Preferably, $R^1$ is selected from the group consisting of divalent radicals (x=1), more preferably an alkylene group or a polyoxyalkylene group. $R^1$ is particularly preferably an ethylene group ($—CH_2—CH_2—$) or a propylene group ($—CH(CH_3)CH_2—/—CH_2CH(CH_3)—$). Furthermore, $R^2$ is preferably a hydrogen radical, i.e. $R^{Acr}$ is particularly preferably derived from hydroxy-functional acrylate esters. Suitable (meth)acrylate esters from which the radicals $R^{Acr}$ can be derived have already been listed above.

Furthermore. $R^2$ is particularly preferably a hydrogen radical. Therefore, particular preference is given to those radicals $R^{Acr}$ bearing one or more acrylate ester groups.

The method product according to the invention or the silicone (meth)acrylate according to the invention is particularly suitable as a component in curing compositions.

The present invention therefore further relates to a composition comprising the method product according to the invention or the silicone (meth)acrylate according to the invention.

It is preferable that this composition according to the invention is curable, preferably curable by means of a radical reaction, wherein the radical reaction can be initiated thermally or by UV radiation or electron beams.

It is further preferable to use the composition according to the invention as a coating composition. Release coatings can be obtained by curing the coating composition.

It is further preferable to use the composition according to the invention in 3D printing processes. The composition according to the invention can be used in this case as starting material for the 3D printing (3D object) to be created. The 3D prints are thus obtainable by curing the starting material.

The compositions according to the invention may be crosslinked three-dimensionally by free radicals, and cure thermally with the addition of, for example, peroxides, or under the influence of high-energy radiation, such as UV or electron beams, within a very short time, to form mechanically and chemically resistant layers which, given a suitable Formulation of the compositions according to the invention, have predeterminable abhesive properties and also adhesion properties.

Where the radiation used is UV radiation, the crosslinking/curing takes place preferably in the presence of photoinitiators and/or photosensitizers. Preferred are photoinitiators of the Norrish 1 type, such as, for example benzophenone, benzoin, α-hydroxyalkylphenone, acylphosphine oxide or derivatives thereof. Customary photoinitiators are described for example in "A Compilation of Photoinitiators Commercially available for UV today" (K. Dietliker, SITA Technology Ltd., London 2002). Preferred compositions according to the invention comprise photoinitiators and/or photosensitizers in a proportion by mass of 0.01% to 10%, especially 0.1% to 5%, based on the mass or the total composition. The photoinitiators and/or photosensitizers are preferably soluble in the compositions according to the invention, more preferably soluble in a proportion by mass of 0.01% to 10%, especially 0.1% to 5%, based on the mass of the total composition.

A preferred composition comprises, in addition to the silicone (meth)acrylate according to the invention, additional components different thereto selected from the group consisting of pure organic phosphorus-containing or phosphorus-free compounds, having at least one ethylenically unsaturated free-radical polymerizable group (e.g. organic monomeric or polymeric (meth)acrylate esters), further organomodified silicones (e.g. silicone (meth)acrylates of the SIC type), silanes, photoinitiators, photosensitizers, thermal radical initiators (e.g. peroxides), fillers (e.g. hydrophobized silicas or metal oxides), MQ resins, pigments, solvents, curing accelerators, antimisting additives, amine synergists and stabilizers (e.g. phosphites or hindered amine light stabilizers (HALS)), antioxidants and oxygen scavengers.

The process for preparing a release coating or a 3D print preferably comprises the following indirectly or directly successive steps:

a. applying the composition to a surface;
b. curing of the composition, preferably by irradiating with UV radiation.

In the production of a 3D print by means of a 3D printing process, the process steps a and b are preferably carried out repeatedly in an alternating sequence. The 3D prints are thus built up stepwise.

Suitable UV radiation sources for curing the compositions according to the invention are medium-pressure mercury vapour lamps, optionally doped, or low-pressure mercury vapour lamps, UV-LED lamps, or so-called excimer emitters. The UV emitters may be polychromatic or monochromatic. The emission range of the emitter is preferably situated in the absorption range of the photoinitiators and/or photosensitizers.

In the production of the release coating it is preferred that the surface is a surface of a carrier, preferably of a sheetlike carrier. The composition of the invention here may be applied one-sidedly or double-sidedly to the sheetlike carrier. The sheetlike carrier is preferably selected from the group consisting of paper, fabric, metal foils and polymeric films. The carrier may be smooth or else may have been provided with surface structures. Particularly preferred carriers are polypropylene films and polyethylene films.

The release coatings find application, for example, in adhesive tapes, labels, packaging for self-adhesive hygiene products, food packaging, self-adhesive thermal papers, or liners for bitumen roofing membranes. The release coatings have a good release effect towards the adhesive materials employed in these applications.

The present invention is described by way of example in the examples set out below, without any possibility that the invention, the scope of application of which is apparent from the entirety of the description, can be read as being confined to the embodiments stated in the examples.

EXAMPLES

The following examples serve only to elucidate this invention for those skilled in the art and do not constitute any restriction whatsoever of the described subject matter. $^1$H-NMR and $^{29}$Si-NMR spectroscopy was used for reaction monitoring in all examples.

General Methods

Nuclear Spin Resonance Spectroscopy (NMR Spectroscopy)

In the context of this invention the $^1$H-NMR samples are analysed at a measurement frequency of 400 MHz in a Bruker 400 spectrometer equipped with a BBI probe head, dissolved at 22° C. in $CDCl_3$ and against a tetramethylsilane (TMS) external standard [$\delta(^1H)$=0.0 ppm].

In the context of this invention the $^{29}$Si-NMR samples are analysed at a measurement frequency of 79.49 MHz in a Bruker Avance III spectrometer equipped with a 287430 sample head with gap width of 10 mm, dissolved at 22° C. in $CDCl_3$ and against a tetramethylsilane (TMS) external standard [$\delta(^{29}Si)$=0.0 ppm].

Gas Chromatography (GC):

The gas chromatograms are recorded on a GC instrument of the GC 7890B type from Agilent Technologies, equipped with a column of the HP-1 type; 30 m×0.32 mm ID×0.25 µm dF (Agilent Technologies no. 19091Z-413E) and hydrogen as carrier gas, with the following parameters:

Detector: FID; 310° C.

Injector: Split; 290° C.

Mode: constant flow, 2 ml/min

Temperature programme: 60° C. at 8° C./min—150° C. at 40° C./min-300° C. 10 min.

Synthesis Examples

Synthesis Example 1 (S1)

a) Preparation of a Linear α,Ω-Diacetoxypolydimethylsiloxane of Average Chain Length N=14:

in a 2 L four-necked flask equipped with KPG stirrer, reflux condenser and internal thermometer, 1349.6 g of decamethykcyclopentasiloxane, 157.2 g of acetic anhydride, 22.6 g of acetic acid and 3.01 g of trifluoromethanesulfonic acid are heated to 150° C. with stirring. After stirring for 6 hours at 150° C., the mixture is cooled to 60° C. 30.1 g of anhydrous sodium carbonate are then added. The mixture is stirred for a further hour and then filtered. The filtrate is obtained as a colourless clear acetoxy silicone of average composition $M^{AcO}{}_2D_{12}$ determined by $^{29}$Si-NMR.

b) Preparation of an α,ω-Silicone Acrylate of Average Formula $M^{AcO}{}_2D_{12}$ where $R^1$=Propylene and $R^2$=H:

in a 500 ml four-necked flask equipped with KPG stirrer, reflux condenser and internal thermometer, 54.68 g of hydroxypropyl acrylate (95% purity, Sigma Aldrich, regioisomeric mixture comprising 25% of the isomer with a primary hydroxyl group (1-hydroxy-2-propyl acrylate) and 75% of the isomer with a secondary hydroxyl group (2-hydroxy-1-propyl acrylate)) is charged with 0.11 g of methylhydroquinone, 0.58 g of trichloroacetic acid (Sigma Aldrich) and 1.41 g of acetic acid (p. a., Baker) and the mixture is stirred. The hydroxypropyl acrylate used here is used without further pre-drying. 226.57 g of the linear α,ω-diacetoxypolydimethylsiloxane of average chain length N=14 and of average formula $M^{AcO}{}_2D_{12}$ obtained in synthesis example 1 a) are rapidly metered in at room temperature and the reaction mixture is heated to 110° C. On heating, the reaction mixture is clear and monophasic. After stirring for 4 hours at 110° C., the reaction mixture is heated on a rotary evaporator at 100° C. for one hour at an applied vacuum of 4 mbar in order to remove volatile reaction products and/or by-products by distillation. In the four-necked flask, to the distillation bottoms cooled to 80° C. is added 5.6 g of anhydrous sodium carbonate and the mixture is stirred at 80° C. for 2 hours. After cooling, the solid is filtered off through a pleated filter and a clear, colourless liquid product is obtained. The $^{29}$Si-NMR spectrum of the product shows that the signals of the Si-bonded acetoxy groups are no longer present and that in place thereof the signals of the SiOC-bonded hydroxypropyl acrylate have appeared. The average chain length, calculated from the $^{29}$Si-NMR spectrum, is N=14. The averaged structure, calculated from the $^{29}$Si-NMR spectrum, therefore corresponds to the approximated formula: $M^{Acr}{}_2D_{12}$ where $R^1$=propylene (—$CH(CH_3)CH_2$—/—$CH_2CH(CH_3)$—) and $R^2$=H.

Synthesis Example 2 (S2)

a) Preparation of a Linear α,ω-diacetoxypolydimethylsiloxane of Average Chain Length N=39 in a 2 L four-necked flask equipped with KPG stirrer, reflux condenser and internal thermometer, 1390.3 g of decamethylcyclopentasiloxane, 70.2 g of acetic anhydride, 21.9 g of acetic acid and 2.96 g of trifluoromethanesulfonic acid are heated to 150° C. with stirring. After stirring for 6 hours at 150° C., the mixture is cooled to 60° C. 29.7 g of anhydrous sodium carbonate are then added. The mixture is stirred for a further hour and then filtered. The filtrate is obtained as a colourless clear acetoxy silicone of average composition $M^{OAc}{}_2$ $D_{37}$ determined by $^{29}$Si-NMR.

b) Preparation of an α,ω-Silicone Acrylate of Average Formula $M^{Acr}{}_2D_{37}$ where $R^1$=Propylene and $R^2$=H:

in a 500 ml four-necked flask equipped with KPG stirrer, reflux condenser and internal thermometer, 27.33 g of hydroxypropyl acrylate (95% purity, Sigma Aldrich, regioisomeric mixture having 25% of the isomer with a primary hydroxyl group (1-hydroxy-2-propyl acrylate) and 75% of the isomer with a secondary hydroxyl group (2-hydroxy-1-propyl acrylate)) Is charged with 0.13 g of methylhydroquinone, 0.65 g of trichloroacetic acid (Sigma Aldrich) and 1.63 g of acetic acid (p. a., Baker) and the mixture is stirred. The hydroxypropyl acrylate used here is used without further pre-drying. 297.93 g of the linear α,ω-diacetoxypolydimethylsiloxane of average chain length N=39 and of average formula $M^{AcO}{}_2D_{37}$ obtained in synthesis example 2 a) are rapidly metered in at room temperature and the reaction mixture is heated to 110° C. On heating, the reaction mixture is clear and monophasic. After stirring for 4 hours at 110° C., the reaction mixture is heated on a rotary evaporator at 100° C. for one hour at an applied vacuum of 4 mbar in order to remove volatile reaction products and by-products by distillation. In the four-necked flask, to the distillation bottoms is added 6.5 g of anhydrous sodium carbonate and the mixture is stirred at 80° C. for 2 hours. After cooling, the solid is separated off through a pleated filter and a colourless clear liquid product is obtained. The $^{29}$Si-NMR of the product shows that the signals of the Si-bonded acetoxy groups are no longer present and that in place thereof the signals of the SiOC-bonded hydroxypropyl acrylate have appeared. Starting from the average formula $M^{OAc}{}_2D_{37}$ for the α,ω-diacetoxypolydimethylsiloxane used, it follows accordingly an α,ω-silicone acrylate of the average formula: $M^{Acr}{}_2D_{37}$ where $R^1$=propylene (—$CH(CH_3)CH_2$—/—$CH_2CH(CH_3)$—) and $R^2$=H.

Synthesis Example 3 (S3)

a) Preparation of a Branched Acetoxy Silicone of Average Formula $M^{AcO}{}_{3.5}D_{22}T_2$ In a 1 L four-necked flask equipped with KPG stirrer, reflux condenser and internal thermometer, 329.91 g of a cyclic branched DT siloxane of the approximate formula $D_{5.45}T$, 381.52 g of decamethylcyclopentasiloxane, 78.61 g of acetic anhydride, 11.85 g of acetic acid and 1.58 g of trifluoromethanesulfonic acid are heated to 150° C. with stirring. After stirring for 6 hours at 150° C., the mixture is cooled to 60° C. 15.8 g of anhydrous sodium carbonate are then added. The mixture is stirred for a further hour and then filtered. The filtrate is obtained as a colourless clear acetoxy silicone to which can be ascribed an average composition of $M^{AcO}_{3.5}D_{22}T_2$ according to $^{29}$Si-NMR.

b) Preparation of a Silicone Acrylate of Average Formula $M^{Acr}_{2.5}D_{18.7}T_2$ where $R^1$=Propylene and $R^2$=H:

in a 500 m1 four-necked flask equipped with KPG stirrer, reflux condenser and internal thermometer, 54.66 g of hydroxypropyl acrylate (95% purity, Sigma Aldrich, regioisomeric mixture having 25% of the isomer with a primary hydroxyl group (1-hydroxy-2-propyl acrylate) and 75% of the isomer with a secondary hydroxyl group (2-hydroxy-1-propyl acrylate)) Is charged with 0.12 g of methylhydroquinone, 0.62 g of trichloroacetic acid (Sigma Aldrich) and 1.55 g of acetic acid (p. a., Baker) and the mixture is stirred. The hydroxypropyl acrylate used here was used without further pre-drying. 255.73 g of the branched terminal acetoxy silicone of average formula $M^{AcO}_{3.5}D_{22}T_2$ obtained in synthesis example 3 a) are rapidly metered in at room temperature and the reaction mixture is heated to 110° C. On heating, the reaction mixture is clear and monophasic. After stirring for 4 hours at 110° C., the reaction mixture is transferred to a rotary evaporator and is freed of volatile reaction products and/or by-products by distillation at 100° C. for one hour and an applied vacuum of 4 mbar. To this, sill on the rotary evaporator, 6.2 g of anhydrous sodium carbonate is added to the distillation bottoms and the distillation is continued at 80° C. for 2 hours. After cooling, the solid is filtered off through a pleated filter and a colourless clear liquid product is obtained. The $^{29}$Si-NMR spectrum of the product shows that the signals of the Si-bonded acetoxy groups are no longer present and that in place thereof the signals of the SiOC-bonded hydroxypropyl acrylate have appeared. The averaged structure, calculated from the $^{29}$Si-NMR spectrum, corresponds to the formula: $M^{Acr}_{2.5}D_{18.7}T_2$ where $R^1$=propylene (—$CH(CH_3)CH_2$—/—$CH_2CH(CH_3)$—) and $R^2$=H.

Synthesis Example 4 (S4)

a) Preparation of a Branched Acetoxy Silicone of Average Formula $M^{AcO}_{5.1}D_{54.5}T_3$ In a 1 L four-necked flask equipped with KPG stirrer, reflux condenser and internal thermometer, 58.84 g of methyltriethoxysilane, 465.95 g of decamethylcyclopentasiloxane and 1.21 g of trifluoromethanesulfonic acid are initially charged and a mixture of 81.42 g of acetic anhydride, 18.19 g of acetic acid are metered in. The mixture is heated stepwise to 150° C. while stirring and the resulting distillate collected. After stirring for 5 hours at 150° C., the mixture is cooled to 60° C. Subsequently, 3.03 g of anhydrous sodium carbonate are added. The mixture is stirred for a further hour and then filtered. The filtrate is obtained as a colourless, clear acetoxy silicone to which can be ascribed an average composition of $M^{AcO}_{5.1}D_{55}T_3$ according to $^{29}$Si-NMR.

b) Preparation of a Silicone Acrylate of Average Formula $M^{AcO}_{3.89}D_{50.3}T_3$ where $R^1$=Propylene and $R^2$=H:

In a 500 m1 four-necked flask equipped with KPG stirrer, reflux condenser and internal thermometer, 42.01 g of hydroxypropyl acrylate (95% purity, Sigma Aldrich, regioisomeric mixture having 25% of the isomer with a primary hydroxyl group (1-hydroxy-2-propyl acrylate) and 75% of the isomer with a secondary hydroxyl group (2-hydroxy-1-propyl acrylate)) are initially charged and stirred with 0.12 g of methylhydroquinone, 0.62 g of trichloroacetic acid (Sigma Aldrich) and 1.54 g of acetic acid (p. a., Baker). The hydroxypropyl acrylate was used here without further pre-drying. 268.43 g of the branched terminal acetoxy silicone of average formula $M^{Acr}_{5.1}D_{54.5}T_3$ obtained in synthesis example 4 a) are rapidly metered in at room temperature and the reaction mixture is heated to 110° C. On heating, the reaction mixture is clear and monophasic. After stirring for 4 hours at 110° C., the reaction mixture is transferred to a rotary evaporator and is freed of volatile reaction products and/or by-products by distillation at 100° C. and an applied vacuum of 4 mbar for one hour. Then, 6.2 g of anhydrous sodium carbonate is added to the distillation bottoms and the mixture is stirred at 80° C. for 2 hours. After cooling, the solid is filtered off through a pleated filter and a colourless, clear liquid product is obtained. The averaged structure, calculated from the $^{29}$Si-NMR spectrum, corresponds to the formula: $M^{Acr}_{3.89}D_{50.3}T_3$ where $R^1$=propylene (—$CH(CH_3)CH_2$—/—$CH_2CH(CH_3)$—) and $R^2$=H.

Synthesis Example 5 (S5)

a) Preparation of a Branched Acetoxy Silicone of Average Formula $M^{Acr}_{3.63}D_{55.6}T_2$ In a 1 L four-necked flask equipped with KPG stirrer, reflux condenser and internal thermometer, 42.79 g of methyltriethoxysilane, 516.11 g of decamethylcyclopentasiloxane and 1.25 g of trifluoromethanesulfonic acid are initially charged and a mixture of 63.70 g of acetic anhydride and 18.68 g of acetic acid is metered in. The mixture is heated stepwise to 150° C. while stirring and the resulting distillate collected. After stirring for 5 hours at 150° C., the mixture is cooled to 80° C. Subsequently, 4.4 g of anhydrous sodium carbonate are added. The mixture is stirred for a further hour and then filtered. The filtrate is obtained as a colourless, clear acetoxy silicone to which can be ascribed an average composition of $M^{Acr}_{3.63}D_{55.8}T_2$ according to $^{29}$Si-NMR.

b) preparation of a silicone acrylate of average formula $M^{Acr}_{3.03}D_{55.8}T_2$ where $R^1$=propylene and $R_2$=H:

In a 500 ml four-necked flask equipped with KPG stirrer, reflux condenser and internal thermometer, 29.18 g of hydroxypropyl acrylate (95% purity. Sigma Aldrich, regioisomeric mixture having 25% of the isomer with a primary hydroxyl group (1-hydroxy-2-propyl acrylate) and 75% of the isomer with a secondary hydroxyl group (2-hydroxy-1-propyl acrylate)) are initially charged and stirred with 0.113 g of methylhydroquinone, 0.57 g of trichloroacetic acid (Sigma Aldrich) and 1.41 g of acetic acid (p. a., Baker). The hydroxypropyl acrylate was used here without further pre-drying. 253.79 g of the branched terminal acetoxy silicone of average formula $M^{Acr}_{3.63}D_{555.8}T_2$ obtained in synthesis example 5 a) are rapidly metered in at room temperature and the reaction mixture is heated to 110° C. On heating, the reaction mixture is clear and monophasic. After stirring for 4 hours at 110° C., the reaction mixture is transferred to a rotary evaporator and is freed of volatile reaction products and/or by-products by distillation initially at 100° C. and an applied vacuum of 2 mbar. After the start of distillation, the temperature is slowly increased to 130° C. and distillation continued at 130° C. and 2 mbar for 3 h. Then, 2.4 g of anhydrous sodium carbonate and 0.02 g of dimethylhexadecylamine are added to the distillation bottoms and the mixture is stirred at 80° C. for 2 hours. After cooling, the solid is filtered off through a pleated filter. The averaged structure, calculated from the $^{29}$Si-NMR spectrum, corresponds to the formula: $M^{Acr}_{3.03}D_{55.09}T_2$ where $R^1$=propylene (—$CH(CH_3)CH_2$—/—$CH_2CH(CH_3)$—) and $R^2$=H. The cyclic siloxane contents determined by gas chromatography are <0.02% D4, <0.02% D5 and <0.26%

D6. The total chlorine content of the product resulting from residual contents of trichloroacetic acid is 391 ppm.

Comparative Example 1 (C1) (Non-Inventive)

Preparation of an SIC-Bonded α,ω-Silicone Acrylate of Chain Length N=28.6 (Corresponds to Comparative Example 1 of WO 2017/080747 A1):

In a heatable 500 ml four-necked flask provided with KPG stirrer, internal thermometer and a gas inlet pipe, 227.7 g of a linear epoxysiloxane bearing SIC-bonded epoxy-functional radicals in the α,ω-position and having an average chain length N=28 are initially charged together with 0.02 g of methylhydroquinone, 0.02 g of para-methoxyphenol, 0.49 g of aqueous Cr(III) acetate solution (50 percent by weight) and 15.2 g of acrylic acid and 0.8 g of acetic acid with stirring. The reaction mixture is then heated to 120° C. with introduction of a moderate air flow. Samples are taken during the reaction and the degree of conversion determined on the basis of the respective acid number. After a reaction time of 18 hours, the reaction is terminated at a conversion of 93%. The mixture is allowed to cool to 25° C., then filtered and the filtrate is subjected to distillation at 120° C. for removal of volatiles. The $^{1}H$- and $^{29}Si$-NMR spectra of the distillation residue verify conversion of 91% of the epoxy groups used to the corresponding carboxylic esters. The viscosity of the product obtained is 1026 mPas.

Performance Testing:

Preparation of Release Coatings:

Performance testing both of the SiOC-based silicone acrylates prepared in synthesis examples S1 to S3 and of the SiC-linked silicone acrylate prepared in comparative example C1 is carried out in formulations for release coatings. Release coatings are known from the prior art, particularity as abhesive coatings on sheetlike carriers and specifically in this case for their use in adhesive tapes or label laminates.

To prepare formulations for release coatings, 98 g of each of the silicone acrylates from synthesis examples S1 to S5 and of comparative example C1 is intensively mixed each with 2 g of photoinitiator TEGO® A18 (Evonik Industries AG).

Additional release coating formulations are prepared in which in each case 30 g of TEGO® RC 711 (Evonik Industries AG) with 68 g of each of the silicone acrylates from synthesis examples S1 to S5 and from comparative example C1 were each intensively blended with 2 g of photoinitiator TEGO® A18 (examples S1a to S5a). TEGO® RC 711 is an acrylate-functional organosiloxane which, according to the data from the accompanying technical data sheet, ensures good fixing of the coating composition to the substrate.

Additional release coating formulations are prepared in which in each case 30 g of components S1 and S3 are mixed in each case with 68 g of component S2, S4, S5 and 2 g of photoinitiator TEGO® A18 (Evonik Industries AG) (examples S2/1, S2/3, S4/1, S4/3. S5/1 and S5/3).

The coating compositions thus prepared are applied to a sheetlike carrier. In all performance examples, this consists of a 50 cm wide, biaxially stretched polypropylene film (BOPP) which, in each case prior to the application of the coating composition using a generator power of 1 kW, was subjected to a corona pre-treatment. The coating materials are applied using a 5-roll coating unit from COATEMA® (Coating Machinery GmbH, Dormagen, Germany) with a weight per unit area of ca. 1 g/m$^2$ and were cured by the action of UV light from a medium-pressure mercury vapour lamp from IST® Metz GmbH (Nürtingen, Germany) at 60 W/cm and at a belt speed of 100 m/min under a nitrogen atmosphere with a residual oxygen content or less than 50 ppm.

The samples thus coated are subjected to a test with respect to rub-off, release value and residual adhesive force.

Rub Off:

The adhesion of the cured coating to the carrier material is verified by vigorous rubbing with the thumb on the coating. In case of insufficient adhesion, abrasion forms in the form of rubbery looking crumbs. Such crumbs ought not to be produced even on intense rubbing. The test is carried out by a trained panel. The assessment is categorized in ranges from 1 to 5, where 1 is very good and 5 is rather poor adhesion to the carrier material.

Release Force:

The release effect with respect to adhesive materials, in industrial application usually in the form of adhesive tapes or labels, is expressed by the release force (RF), with a low release force describing a good release effect. The release force is dependent on the quality of the release coating, on the adhesive itself and on the test conditions. For evaluation of release coatings, therefore. Identical adhesives and test conditions ought to be present. For the determination or the release forces, adhesive tapes or label laminates are cut to a width of 2.5 cm and then the adhesive side is applied in each case to the silicone coating under test. This test is carried out in accordance with *FINAT Handbook, 8th Edition, The Hague/NL,* 2009 under designation FTM 10, with the modification that storage is carried out at 40° C. under pressure. The adhesive tape employed is Tesa® 7475 (trade mark of Tesa SE, Hamburg, Germany). The values reported are in each case average values from a five-fold determination and are stated in units [cN/2.5 cm]. Systems with a release force below 10 cN/2.5 cm are classified as easy release and are typically suitable for many applications such as label laminates for example.

Residual Adhesive Force:

The residual adhesive force (RAF) is determined according to the test protocol FTM 11 in *FINAT Handbook 8th Edition, The Hague/NL,* 2009 with the exception that storage of the test adhesive strip in silicone contact is carried out for one minute and the standard surface is an untreated BOPP surface. The adhesive tape employed is Tesa® 7475 (trade mark of Tesa SE, Hamburg, Germany). The residual adhesive force is a measure of the crosslinking of the silicones. If non-polymerized and thus migratable silicone constituents are present, residual adhesion force values decrease with increasing proportion of such components. Values above 80% are regarded as acceptable. The results of the rub off test, the release forces and the short term residual adhesive forces (RAF) are presented in Table 1.

TABLE 1

Results of performance testing (rub off in notes 1 to 5; release forces (RF) in cN/2.5 cm after 24 hours storage at 40° C.; residual adhesive force (RAF) in %).

| Example | Rub off | RF (TESA ® 7475) [cN/2.5 cm] | RAF [%] |
|---|---|---|---|
| C1 | 5 | 8 | 89 |
| S1 | 2 | 26 | 91 |
| S2 | 5 | 8 | 89 |
| S3 | 2 | 25 | 98 |
| S4 | 5 | 10 | 92 |
| S5 | 5 | 7 | 89 |

TABLE 1-continued

Results of performance testing (rub off in notes 1 to 5; release forces (RF) in cN/2.5 cm after 24 hours storage at 40° C.; residual adhesive force (RAF) in %).

| Example | Rub off | RF (TESA ® 7475) [cN/2.5 cm] | RAF [%] |
|---|---|---|---|
| C1a | 2 | 8 | 90 |
| S1a | 1 | 31 | 90 |
| S2a | 2 | 9 | 88 |
| S3a | 1 | 33 | 97 |
| S4a | 1 | 11 | 93 |
| S5a | 1 | 8 | 91 |
| S2/1 | 2 | 9 | 89 |
| S2/3 | 2 | 10 | 87 |
| S4/1 | 1 | 9 | 88 |
| S4/3 | 2 | 10 | 91 |
| S5/1 | 2 | 8 | 87 |
| S5/3 | 2 | 7 | 92 |

It is apparent from Table 1 that inventive examples S2, S4 and S5 enable an equally low release force as comparative example C1. However, a disadvantage of the coatings based on S2, S4, S5 and C1 is their low adhesion to the substrate (rub-off). However, this can be significantly improved by addition of a customary adhesion component, here TEGO® RC 711, without other properties (RF and RAF) being negatively influenced (example coatings S2a, S4a, S5a and C1a).

The two inventive examples S1 and S3 already result in good adhesion without an additional adhesion component. The release forces are for applications that are somewhat high, where a light release behaviour is especially important. However, there are special applications in which this release behaviour is also appreciated. Moreover, S1 and S2 may serve as replacement for TEGO® RC 711 in its function as adhesion component which is evident from examples S2/1, S2/3, S4/1, S4/3, S5/1 and S5/3.

All inventive examples exhibit good curing which is evident from the short term residual adhesive forces (RAF). The components prepared according to the invention therefore meet all important requirements for use in release coatings. They can—adapted to the respective system—be used either as adhesion components or as components with low release forces.

The invention claimed is:

1. A method for preparing silicone (meth)acrylates, comprising:

reacting at least one acetoxy silicone with at least one hydroxy-functional (meth)acrylic ester.

2. The method according to claim 1, wherein the at least one acetoxy silicone is a compound of formula (I), $$M_{m1}M^{AcO}_{m2}D_{d1}D^{AcO}_{d2}T_tQ_q$$ formula (I), where $M=[R_3SiO_{1/2}]$;

$M^{AcO}=[R_2(AcO)SiO_{1/2}]$;

$D=[R_2SO_{2/2}]$;

$D^{AcO}=[R(AcO)SiO_{2/2}]$;

$T=[RSiO_{3/2}]$;

$Q=[SiO_{4/2}]$;

m1=0 to 32;

m2=0 to 32;

d1=1 to 1000;

d2=0 to 10;

t=0 to 10;

q=0 to 10;

in which

R is in each case independently a monovalent organic radical;

AcO is an acetoxy group;

with the proviso that:

m1+m2=at least 2;

m2+d2=at least 1.

3. The method according to claim 1, wherein the at least one acetoxy silicone is produced by reacting silanes and/or siloxanes bearing alkoxy groups, and/or silanes and/or siloxanes bearing acetoxy groups, and/or silanes and/or siloxanes bearing hydroxyl groups, and/or simple siloxane cycles and/or DT cycles, with acetic anhydride and, as catalyst, at least one Brønsted acid having a pKa of ≤−1.3.

4. The method according to claim 3, wherein the at least one Brønsted acid is neutralized with a base prior to further reaction with the at least one hydroxy-functional (meth) acrylic ester.

5. The method according to claim 1, wherein the at least one hydroxy-functional (meth)acrylic ester is a compound of the formula (I), formula (II)

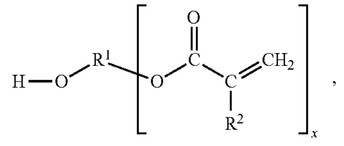

wherein x=at least 1;

in which $R^1$ is in each case independently a (x+1)-valent organic radical, and $R^2$ is in each case independently a hydrogen radical or a methyl radical.

6. The method according to claim 1, wherein a molar ratio of hydroxyl groups of the at least one hydroxy-functional (meth)acrylic ester to acetoxy groups of the at least one acetoxy silicone is at least 1.00.

7. The method according to claim 1, wherein the at least one acetoxy silicone is reacted with the at least one hydroxy-functional (meth)acrylic ester in the presence of at least one catalyst selected from the group consisting of Brønsted acids having a pKa of <−3;

Lewis acids; and metal catalysts.

8. The method according to claim 1, wherein the reaction of the at least one acetoxy silicone with the at least one hydroxy-functional (meth)acrylic ester is carried out at a temperature of 40° C. to 150° C., over a period of one to 8 hours.

9. The method according to claim 1, wherein a reaction product is freed of volatile constituents over 1 to 8 hours, at a temperature of 80° C. to 140° C., under application of a vacuum of less than 200 mbar.

10. The method according to claim 1, wherein acids present in a reaction product are neutralized at a temperature of 20° C. to 110° C., by adding a solid, liquid or gaseous base.

11. The method according to claim 7, wherein the Brønsted acids are selected from the group consisting of trifluoromethanesulfonic acid, methanesulfonic acid, para-toluenesulfonic acid, and trifluoroacetic acid; and wherein the metal catalysts are selected from the group consisting of titanium tetrabutoxide, zinc acetylacetonate, and zinc carboxylate.

* * * * *